(12) United States Patent
Beaman et al.

(10) Patent No.: US 10,956,520 B1
(45) Date of Patent: Mar. 23, 2021

(54) DYNAMIC IMAGE SEARCH ENGINE FOR PERSONALIZED IMAGE EDITING

(71) Applicant: SHUTTERSTOCK, INC., New York, NY (US)

(72) Inventors: Roger Beaman, New York, NY (US); Steve Blaurock, Queens, NY (US)

(73) Assignee: Shutterstock, Inc., New York, NY (US)

( * ) Notice: Subject to any disclaimer, the term of this patent is extended or adjusted under 35 U.S.C. 154(b) by 177 days.

(21) Appl. No.: 15/806,233

(22) Filed: Nov. 7, 2017

(51) Int. Cl.
  *G06F 16/953* (2019.01)
  *G06F 16/9535* (2019.01)
  *G06F 16/58* (2019.01)
  *G06N 3/08* (2006.01)
  *G06N 3/04* (2006.01)

(52) U.S. Cl.
  CPC ...... *G06F 16/9535* (2019.01); *G06F 16/5866* (2019.01); *G06N 3/04* (2013.01); *G06N 3/08* (2013.01)

(58) Field of Classification Search
  CPC ... G06F 16/9535; G06F 16/5866; G06N 3/04; G06N 3/08
  See application file for complete search history.

(56) References Cited

U.S. PATENT DOCUMENTS

| | | | | |
|---|---|---|---|---|
| 10,740,385 B1 * | 8/2020 | Hohwald | ............ | G06F 16/9535 |
| 2002/0194219 A1 * | 12/2002 | Bradley | ................ | G06F 16/972 |
| | | | | 715/223 |
| 2006/0195789 A1 * | 8/2006 | Rogers | ................ | G06F 21/10 |
| | | | | 715/727 |
| 2007/0162846 A1 * | 7/2007 | Cave | ................ | G06F 16/958 |
| | | | | 715/210 |
| 2007/0271297 A1 * | 11/2007 | Jaffe | ................ | G06K 9/6219 |
| 2010/0115036 A1 * | 5/2010 | Rosner | ................ | G06F 16/44 |
| | | | | 709/206 |
| 2011/0276871 A1 * | 11/2011 | Caraher | ................ | G16H 10/20 |
| | | | | 715/221 |
| 2011/0295661 A1 * | 12/2011 | Dodge | ................ | G06Q 30/0241 |
| | | | | 705/14.4 |

(Continued)

OTHER PUBLICATIONS

Nielsen et al., "MediaJourney: capturing and sharing digital media from real-world and virtual journeys", pp. 341-342 (Year: 2009).*

*Primary Examiner* — Mark D Featherstone
*Assistant Examiner* — Kweku William Halm
(74) *Attorney, Agent, or Firm* — McDermott Will & Emery LLP

(57) ABSTRACT

A method for receiving a request for a design template from a client device, the design template including a dynamic media file indicator is provided. The request includes collecting user information indicative of a location of the client device, a demographic datum of a user associated with the client device, or a language of the user associated with the client device, and selecting a media file from a database of media files based on the user information. The method also includes modifying the design template based on the user information to include the media file and providing the design template comprising the media file for display by the client device. A computer-readable medium including commands and a system including a processor to execute the commands and perform the above method are also provided.

20 Claims, 9 Drawing Sheets

(56) References Cited

U.S. PATENT DOCUMENTS

| | | | |
|---|---|---|---|
| 2015/0012819 A1* | 1/2015 | Basavaraj | G06F 40/103 |
| | | | 715/236 |
| 2015/0106183 A1* | 4/2015 | McEvilly | H04W 4/025 |
| | | | 705/14.25 |
| 2016/0034459 A1* | 2/2016 | Larsen | G06F 16/489 |
| | | | 707/740 |
| 2016/0078139 A1* | 3/2016 | Clinton | H04L 65/4084 |
| | | | 707/723 |
| 2016/0210287 A1* | 7/2016 | Jacoby | G06Q 50/01 |
| 2019/0108772 A1* | 4/2019 | Kalra | G06K 7/10297 |
| 2019/0182525 A1* | 6/2019 | Steinberg | G11B 27/034 |

* cited by examiner

US 10,956,520 B1

DYNAMIC IMAGE SEARCH ENGINE FOR PERSONALIZED IMAGE EDITING

BACKGROUND

Field

The present disclosure generally relates to search engines configured to provide dynamic media files personalized according to personalized user information. More specifically, the present disclosure relates to search engines including learned models that adapt the search results to personalized user information.

Description of the Related Art

Editor templates that include search engines associated with a multimedia database commonly have the limitation of producing static images and other multimedia files. For example, an advertising campaign may include enticing images and text conveniently chosen by the content creator (e.g., "user") with a specific market segment in mind. However, it is well known that the same advertising feature (e.g., image, video clip, sound bite, and the like) will have different rate of success in different geographic locations, languages, and age groups which eventually lead to incorrect matchings, increased expenses, and time consumed for the campaign (e.g., recruiting local "curators" for different countries or regions).

SUMMARY

In one embodiment of the present disclosure, a computer-implemented method is described. The computer-implemented method includes receiving a request for a design template from a client device, the design template including a dynamic media file indicator and the request including user information indicative of a location of the client device, a demographic datum of a user associated with the client device, or a language of the user associated with the client device, and selecting a media file from a database of media files based on the user information. The computer-implemented method also includes modifying the design template based on the user information to include the media file, and providing the design template comprising the media file for display by the client device.

According to one embodiment, a system is described that includes at least one processor and a memory coupled to the at least one processors, the memory including instructions that, when executed by the at least one processor, cause the at least one processor to receive a request for a design template from a client device, the design template including a dynamic media file indicator, and the request including user information indicative of a location of the client device, a demographic datum of a user associated with the client device, or a language of the user associated with the client device, and to select a media file from a database of media files based on the user information. The at least one processor also executes instructions to modify the design template based on the user information to include the media file, and to provide the design template comprising the media file for display by the client device.

According to one embodiment, a non-transitory, machine readable medium is described that includes instructions, which when executed by one or more processors, cause a computer to perform a method for receiving a request for a design template from a client device, the design template including a dynamic media file indicator, the request includes user information indicative of a location of the client device, a demographic datum of a user associated with the client device, or a language of the user associated with the client device, and selecting a media file from a database of media files based on the user information. The method also includes modifying the design template based on the user information to include the media file, and providing the design template comprising the media file for display by the client device.

In yet other embodiment, a system is described that includes a means for storing commands and a means for executing the commands causing the system to perform a method including receiving a request for a design template from a client device, the design template including a dynamic media file indicator. The request includes user information indicative of a location of the client device, a demographic datum of a user associated with the client device, or a language of the user associated with the client device, and selecting a media file from a database of media files based on the user information. The method also includes modifying the design template based on the user information to include the media file, and providing the design template comprising the media file for display by the client device.

In a further embodiment, a computer-implemented method is described. The computer-implemented method includes providing an input query for a media file in a design template supported by an application on a client device, providing at least one geographic location for tailoring a search result for the media file in the design template, and selecting an image from a results panel displayed on a user interface of the application in a display of the client device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

General Overview

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and a label, or a caption associated with an image for identifying the image.

Embodiments as disclosed herein serve "responsive" images to a user creating a media file with a design template that has access to an image search engine, based on conditions of consumer who loads the image (locale, language, browser). For example, a user in Japan may access a design template from an advertising campaign for automobiles or motorcycles using an image search engine. Accordingly, the image search engine may provide to the user in Japan pictures of Japanese cities or landmark (e.g., mount Fuji) to be placed as background for the automobile or motorcycle in the advertisement. On the other hand, a user in the United States accessing the same design template using a search engine as disclosed herein may see a display wherein the same automobile or motorcycle has a background of a US city or landmark (e.g., mount Rushmore).

The proposed solution further provides improvements to the functioning of the computer itself because it saves data storage space and reduces network usage (e.g., during an image search in multiple languages), and personal time for the user creating multiple designs targeting different geographic regions, languages, and age groups.

Although many examples provided herein describe a user's search inputs being identifiable, or download history for images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

Example System Architecture

Figure 1:
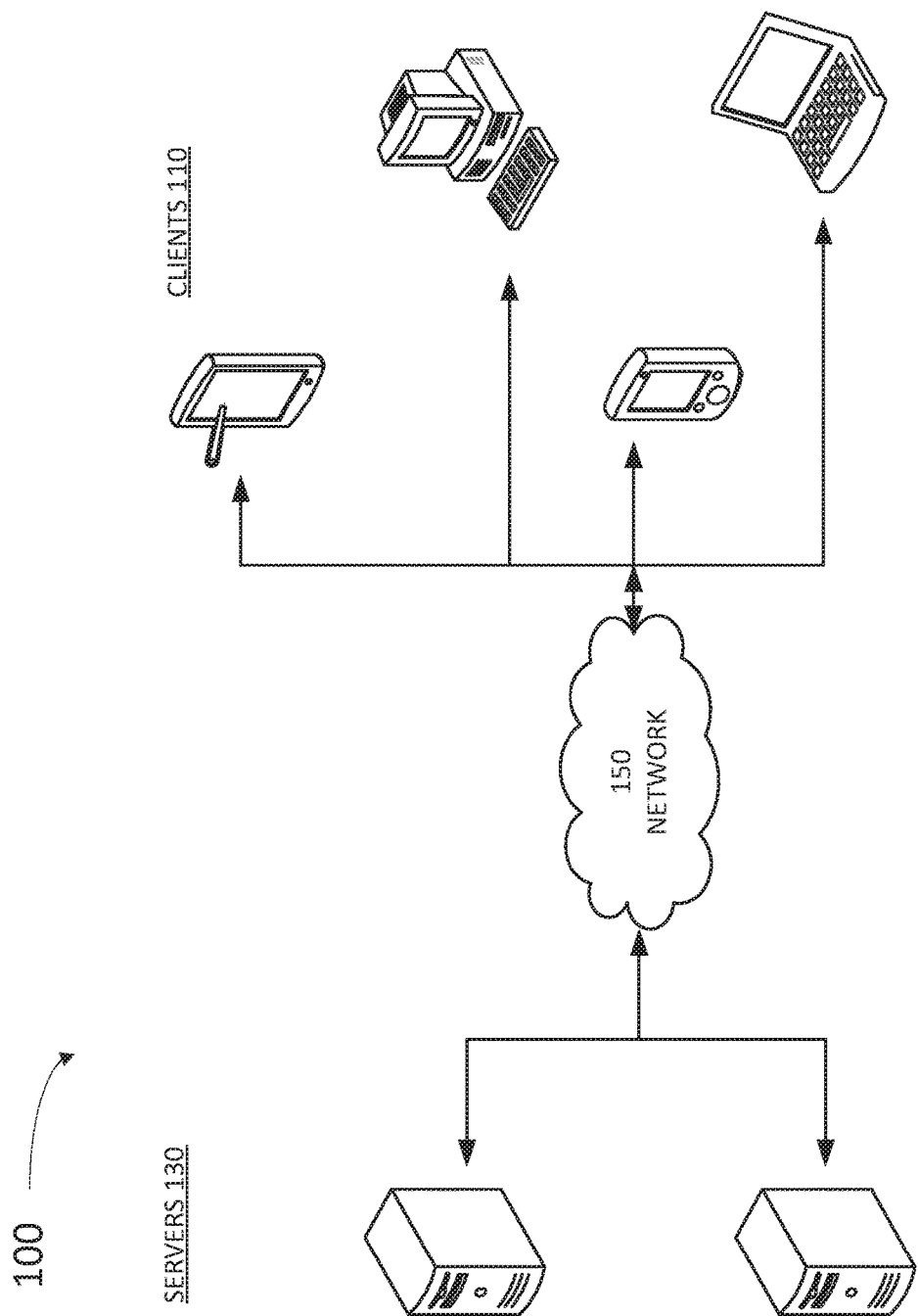
FIG. 1 illustrates an example architecture suitable for processing an image search query, according to some embodiments.

FIG. 1 illustrates an example architecture 100 for an image search with intersected predicted queries suitable for practicing some implementations of the disclosure. The architecture 100 includes servers 130 and clients 110 connected over a network 150. One of the many servers 130 is configured to host a memory including instructions which, when executed by a processor, cause the server 130 to perform at least some of the steps in methods as disclosed herein. In some embodiments, the processor is configured to search and find multimedia data files including images, video, music, and the like using text queries input by a user through client device 110. Further, in some embodiments the processor in server 130 is configured to find predicted queries from an input user query (IUQ), and to search and find multimedia data files using the predicted search queries. Accordingly, one of the many servers 130 also hosts a collection of images, videos, and multimedia files. The collection of multimedia files can be searched using an image search engine (e.g., accessible through a web page or an application running on one of clients 110). Servers 130 can return images tagged with an image score to clients 110 in response to the IUQ. Moreover, in some embodiments the processor is configured to associate the IUQ with a predicted query string from a query stream log. For purposes of load balancing, multiple servers 130 can host memories including instructions to one or more processors and multiple servers 130 can host the collection of images.

Servers 130 may include any device having an appropriate processor, memory, and communications capability for hosting the collection of images and the image search engine. The image search engine is accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Example Automatic System

Figure 2:
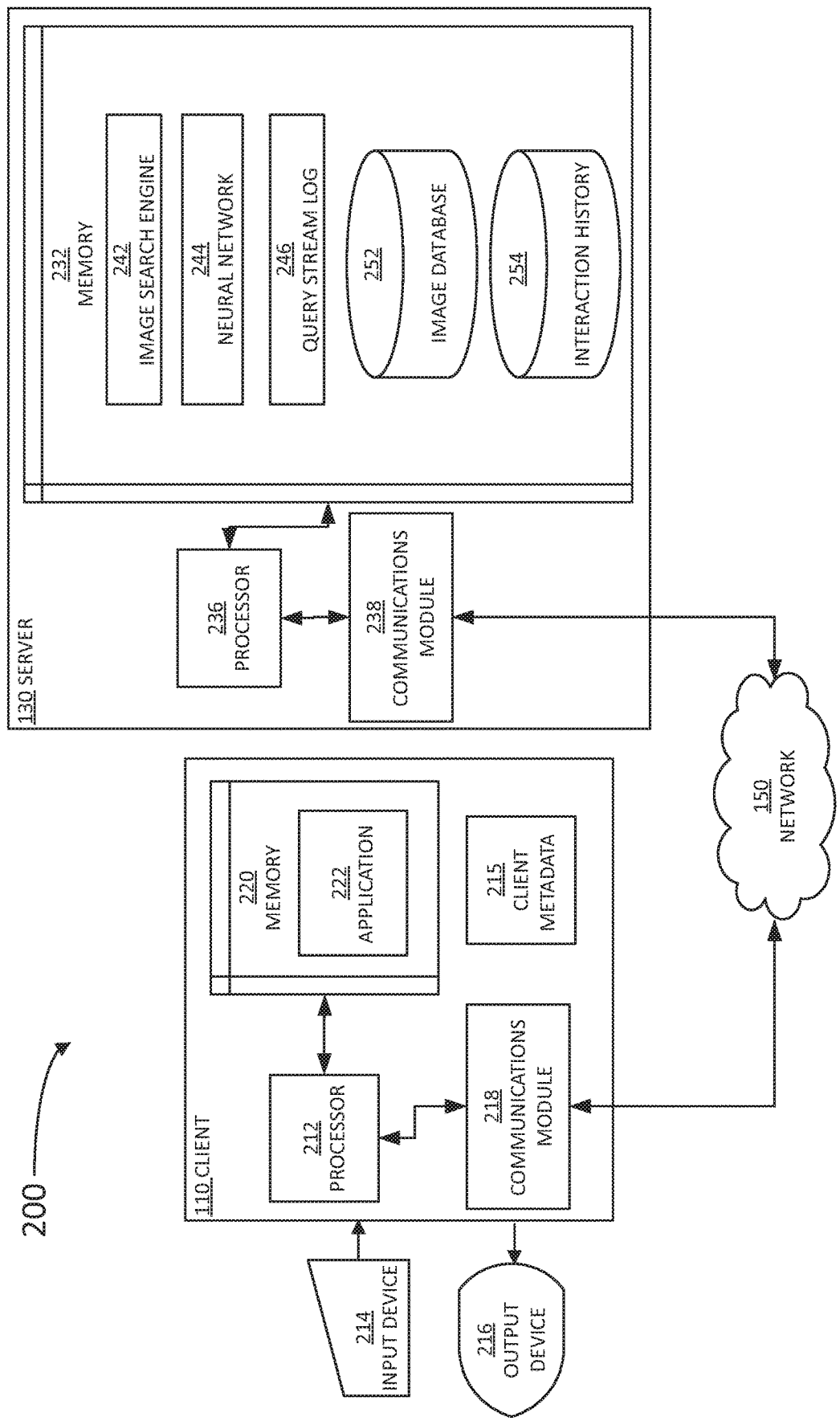
FIG. 2 is a block diagram illustrating an example server and client from the architecture of FIG. 1 according to certain aspects of the disclosure.

FIG. 2 is a block diagram 200 illustrating an example server 130 and client 110 in the architecture 100 of FIG. 1 according to certain aspects of the disclosure. Client 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Memory 232 includes an image database 252 and an image search engine 242 for searching image database 252. In one or more implementations, image database 252 represents a database that contains, for each image, a mapping from an image identifier to a data file containing pixel data for the image (e.g., in jpeg format).

Server 130 includes a memory 232, a processor 236, and communications module 238. Moreover, in some embodiments processor 236 is configured to obtain a set of predicted queries from a query stream log 246, from an interaction history information in an interaction history database 254, and from an IUQ received from a user through a user interface for image search engine 242. The user interface is displayed for the user in an output device 216 of client 110. Query stream log 246 includes a plurality of query strings previously used by one or more users interacting with image search engine 242. In some aspects, processor 236, using query stream log 246 and executing instructions from memory 232, can provide a set of predicted queries from query stream log 246 to image search engine 242. Processor 236 may also display the set of predicted queries to the user in a pull down menu of the user interface.

The user may access image search engine 242 through an application 222 or a web browser installed in client 110. Execution of application 222 may be controlled by a processor 212 in client 110. Image database 252 can be, for example, a dataset associated with images corresponding to a number of style classes (e.g., about 25). The images may be paired with image vector information and image cluster information. The image vector information identifies vectors representing a large sample of images (e.g., about 50 million) and the image cluster information identifies the vectors in one or more clusters such that each of the cluster of images represents a semantic concept.

Although image database 252 and image search engine 242 are illustrated as being in the same memory 232 of a server 130, in certain aspects the image database 252 and image search engine 242 can be hosted in a memory of a different server but accessible by server 130 illustrated in FIG. 2. In some embodiments, image search engine 242 is configured to execute commands and instructions from a neural network (NN) 244. NN 244 may include a LNN, a DNN, or a convolutional neural network (CNN).

Memory 232 also includes interaction history data 254. In certain aspects, processor 236 is configured to determine the interaction history data 254 by obtaining user interaction data identifying interactions with images from image search results that are responsive to search queries. For example, the processor 236 may determine that a user interacted with an image from a search result, such as by clicking on the image, saving the image for subsequent access, or downloaded the image to a client (e.g., client 110), or the like. The processor 236 may keep track of the user interactions with a number of images over a given time period. The interaction history 254 may also include data indicating search behavior (and/or patterns) relating to prior image search queries.

Processor 236 is configured to execute instructions, such as instructions physically coded into processor 236, instructions received from software in memory 232, or a combination of both. The IUQ identifies a user search query in a given natural language. For example, the search query may be entered as an English term or combination of terms. A user of client 110 may use input device 214 to submit a search term or phrase via a user interface of application 222. The user interface may include an input section where the search term or phrase may be typed in, for example. The input section may include one or more controls to allow the user to initiate the image search upon receiving the search query. In some aspects, the image search may be initiated automatically upon receiving at least one search term (or at least the search phrase in part). As described herein, the natural language used in image search engine 242 is not limited to English, and the natural language can vary to include other natural languages depending on implementation.

A search query is then provisioned to image search engine 242 for initiating the image search through image database 252. The IUQ is provided, for example, by the user accessing image search engine 242 over network 150 using application 222 in memory 220 on client 110. The user submits the IUQ using input device 214 of client 110. For example, the user may use input device 214 to enter a text-based search term or phrase. In response to the IUQ, a processor in client 110 transmits the search query over the network 150 using communications module 218 of client 110 to communications module 238 of server 130.

Processor 236, upon receiving the IUQ, submits a search request to image search engine 242. In some embodiments, processor 236 receives an identification of a plurality of images from image database 252 that are responsive to the IUQ and also to the set of predicted queries. The plurality of images from image database 252 may be sorted according to an image score (e.g., using interaction history database 254) indicating a probability of a user interaction for each image (e.g., the probability of a user clicking a thumbnail associated with one of the images). Processor 236 may then provide the listing of images to application 222 over network 150 for display by output device 216. The listing of images may include a plurality of thumbnails in a results panel of the user interface in output device 216.

Figure 3:
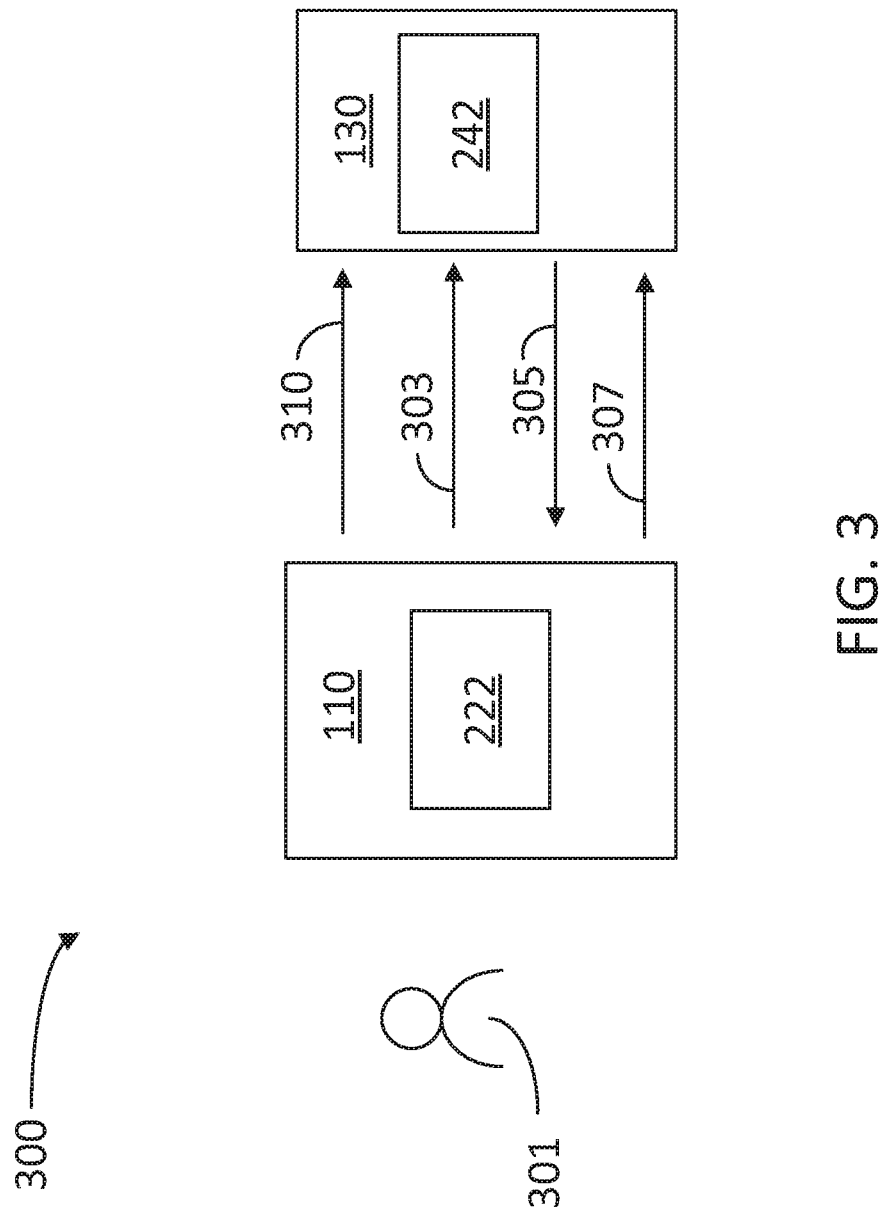
FIG. 3 is a walk-through illustration of an image editor including a dynamic image search engine, according to some embodiments.

FIG. 3 is a walk-through illustration of an image editor 300 including a dynamic image search engine 242 in server 130, according to some embodiments. Client device 110 includes application 222 accessed by a user 301. Through application 222, user 301 creates a design template (e.g., for an advertisement campaign) and sends an image request 303 to image search engine 242. Together with request 303, application 222 may include user information 310 (e.g., metadata). User information 310 may include a language for user 301, a geographic location of user 301, or a demographic datum for user 301, such as age group, gender, and the like. Based on image request 303 and on user information 310, server 130 provides image 305 to application 222 so that user 301 may include it in the design template.

In some embodiments, user 301 is a content creator that produces multiple design templates, assigning each design template to a different customer segment (e.g., age group, geographic location, and the like). Accordingly, user 301 may select a dynamic media file indicator 307 including parameters configured by the content creator, for determining how to select media files to be displayed in a design template when a user accesses dynamic image search engine 242 and requests a design template. For instance, if a dynamic image 305 is based on locale, the user 301 may assign a unique design to the United States (labeled "USA"), to France (labeled "FR"), and to Italy (labeled "IT"). Image search engine 242 generates a link to a "dynamic image" and places the link in the script for the design template of user 301 upon identifying dynamic media file indicator 307 in the design template. When the dynamic image is accessed (e.g., by a user form the United States), the server will detect the location of the user accessing the image, assign them into the appropriate segment (e.g., labeled "USA"), and serve the image assigned by user 301. Accordingly, when the content creator desires to provide a design template targeted for the US, the content creator may configure the indicator to select images of a certain type (e.g., background, landscape, buildings, street views, etc.) having an associated geolocation to a certain area (e.g., US, East Coast US, West Coast US, and the like), or a weighting biased towards a certain area (e.g., images and media files more likely to be downloaded or otherwise interacted with by users having a geolocation within the US, as detected by the server providing the design template to the end user).

Figure 4:
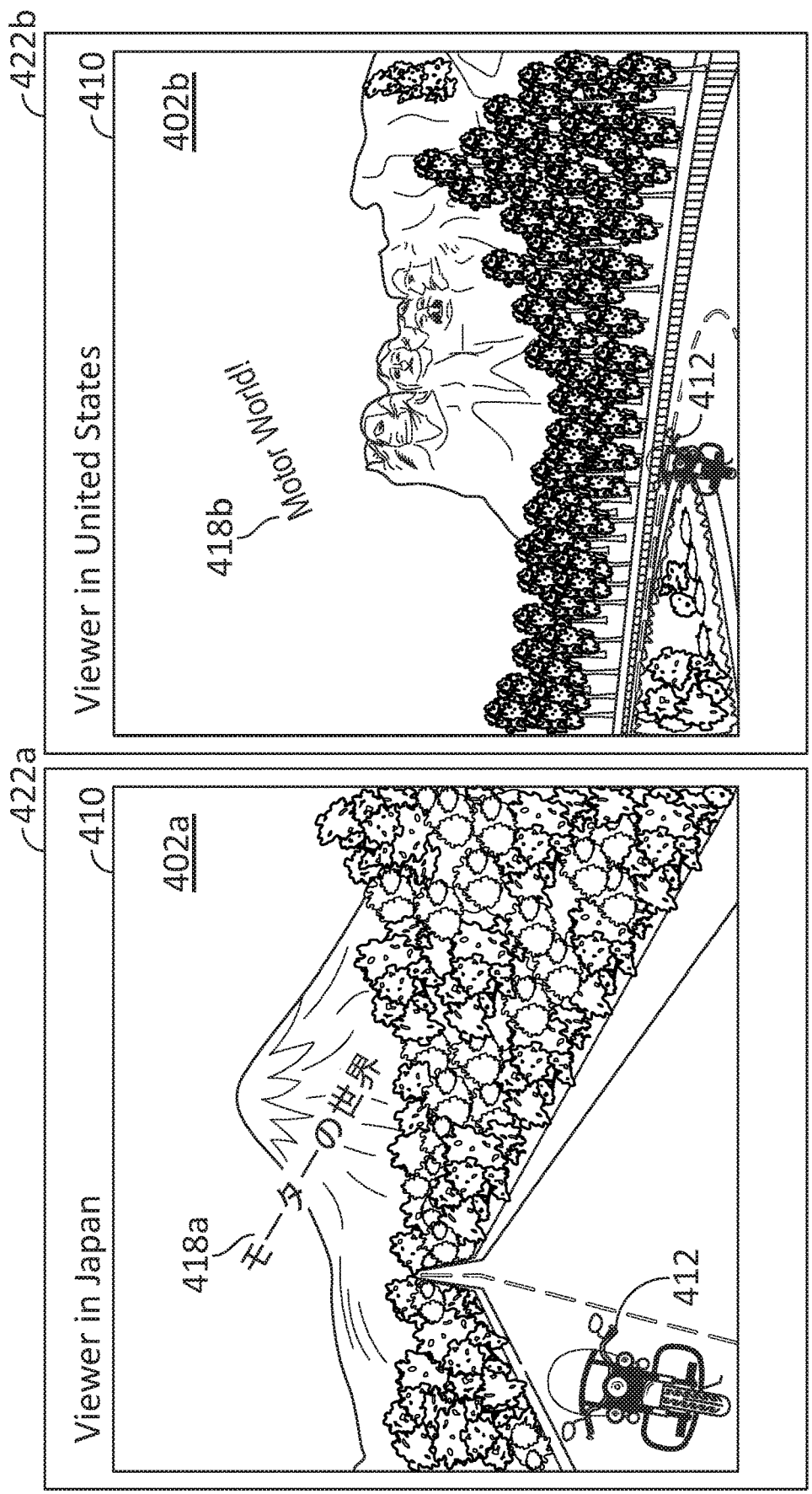
FIG. 4 illustrates a dynamic image originating from the same image editor and displayed according to two different geographic locations of a viewer, according to some embodiments.

FIG. 4 illustrates dynamic panels 422a and 422b (hereinafter, collectively referred to as "dynamic panels 422") originating from the same image editor and displayed according to two different geographic locations of a viewer, according to some embodiments. For example, dynamic panel 422a displays design template 310 as an advertisement for a motorcycle 412 when a viewer is in Japan, including a legend 418a ("Motor World" in Japanese). A background picture 402a shows a road next to mount Fuji, thereby making the image of motorcycle 412 more appealing to a viewer in Japan. Likewise, dynamic panel 422b displays design template 410 as an advertisement for motorcycle 412 when a viewer is in the United States, including a legend 418b (in English). A background picture 402 shows a road next to mount Rushmore, thereby making the image of motorcycle 412 more appealing to a viewer in the United States.

In some embodiments design template 410 includes a dynamic media file indicator with parameters configured by the designer, for determining how to select the media file associated with dynamic panels 422 (e.g., legends 418a and 418b, and background pictures 402a and 402b)

Figure 5:
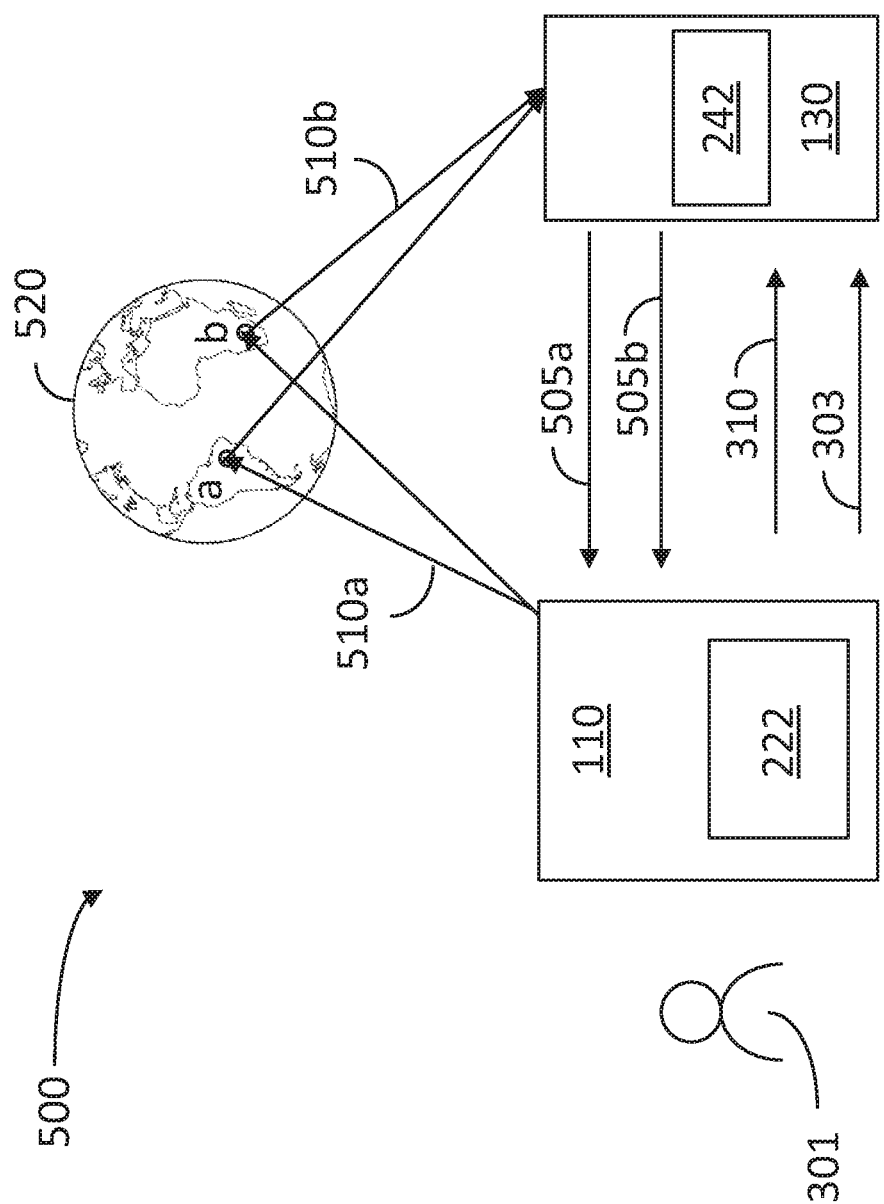
FIG. 5 is a walk-through illustration of an image editor including a dynamic image search engine tailored for a geographic location, according to some embodiments.

FIG. 5 is a walk-through illustration of an image editor 500 including a dynamic image search engine 242 tailored for a geographic location (e.g., "a" or "b"), according to some embodiments. Similarly to image editor 300, image editor 500 includes client device 110 and application 222 accessed by user 301. Through application 222, user 301 creates a design template (e.g., for an advertisement campaign) and sends an image request 303 to image search engine 242. Together with request 303, application 222 may include user information 310 (e.g., metadata). User information 310 may include a language for user 301, a geographic location of user 301, or a demographic datum for user 301, such as age group, gender, and the like. User 301 may also indicate to image search engine 242 a location 510a (e.g., South America) or 510b (e.g., East Africa) for tailoring the design template appropriately. Hereinafter, location 510a and location 510b will be collectively referred to as, "geographic selections 510." Based on image request 303, the geographic selections 510, and on user information 310, server 130 provides images 505a (associated with geographic location 510a) and 505b (associated with geographic location 510b) to application 222 so that user 301 may include it in the design template. For example, images 505a may include Tones del Paine (in the Chilean Patagonia) and the Amazon river (in Brazil) when the user has selected location 510a in South America and request 303 includes "mountain" or "river" within the text string. Likewise, images 505b may include mount Kilimanjaro (in the Tanzania) and the Nile river (in Sudan-Egypt) when the user has selected location 510b in Africa and request 303 includes "mountain" or "river" within the text string. Images 505a and 505b will be referred to, hereinafter, as images 505. Note that geographic selections 510 are independent of the specific geographic location or language of user 301 (e.g., the language in application 222 as provided in user information 310). In that regard, image search engine 242 may return images 405 including text in the language appropriate for geographic locations 510 and not necessarily for user 301.

Figure 6:
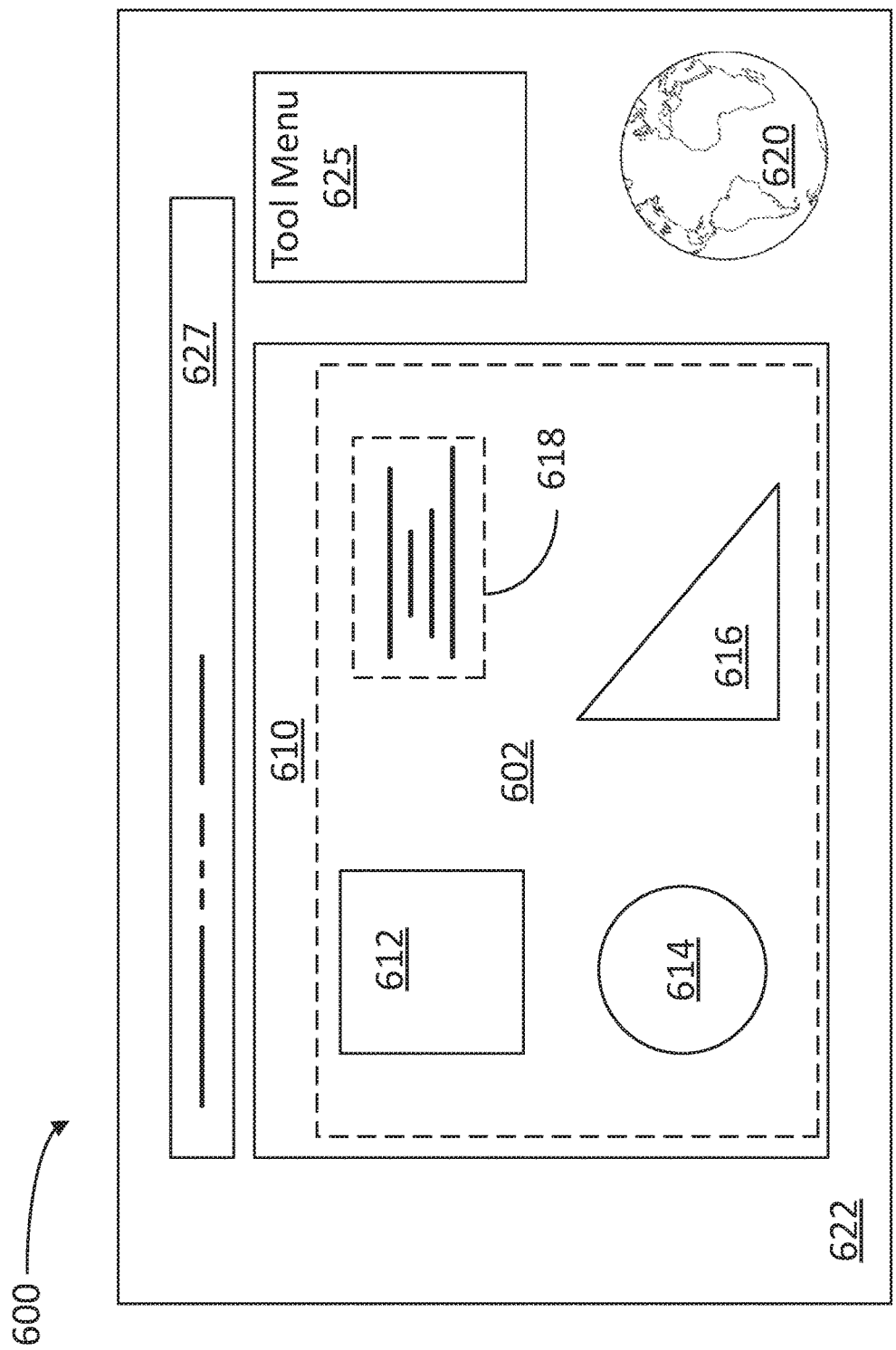
FIG. 6 illustrates a screen shot of a web page of an image editor configured for tailoring an image to a selected geographic location, according to some embodiments.

FIG. 6 illustrates a screen shot of a web page of an image editor 600 configured for tailoring an image to a selected geographic location, according to some embodiments. Image editor 600 includes a search query 627, and a design template 610 in a panel 622 provided to the display or output device of a client device controlled by the user (e.g., client device 110, and output device 216). Panel 622 includes a tool menu 625 for the user to edit design template 610, and a geographic locator 620, wherein the user may select geographic locations (e.g., geographic locations 510) to apply dynamic images for design template 610.

Design template 610 may include different media files such as an image 612, a link to a sound file 614, and a link to a video file 616. Further, in some embodiments design template 610 also includes a text portion 618 (e.g., in an advertisement). Design template 610 may also include a background image 602, selected according to embodiments disclosed herein.

Figure 7:
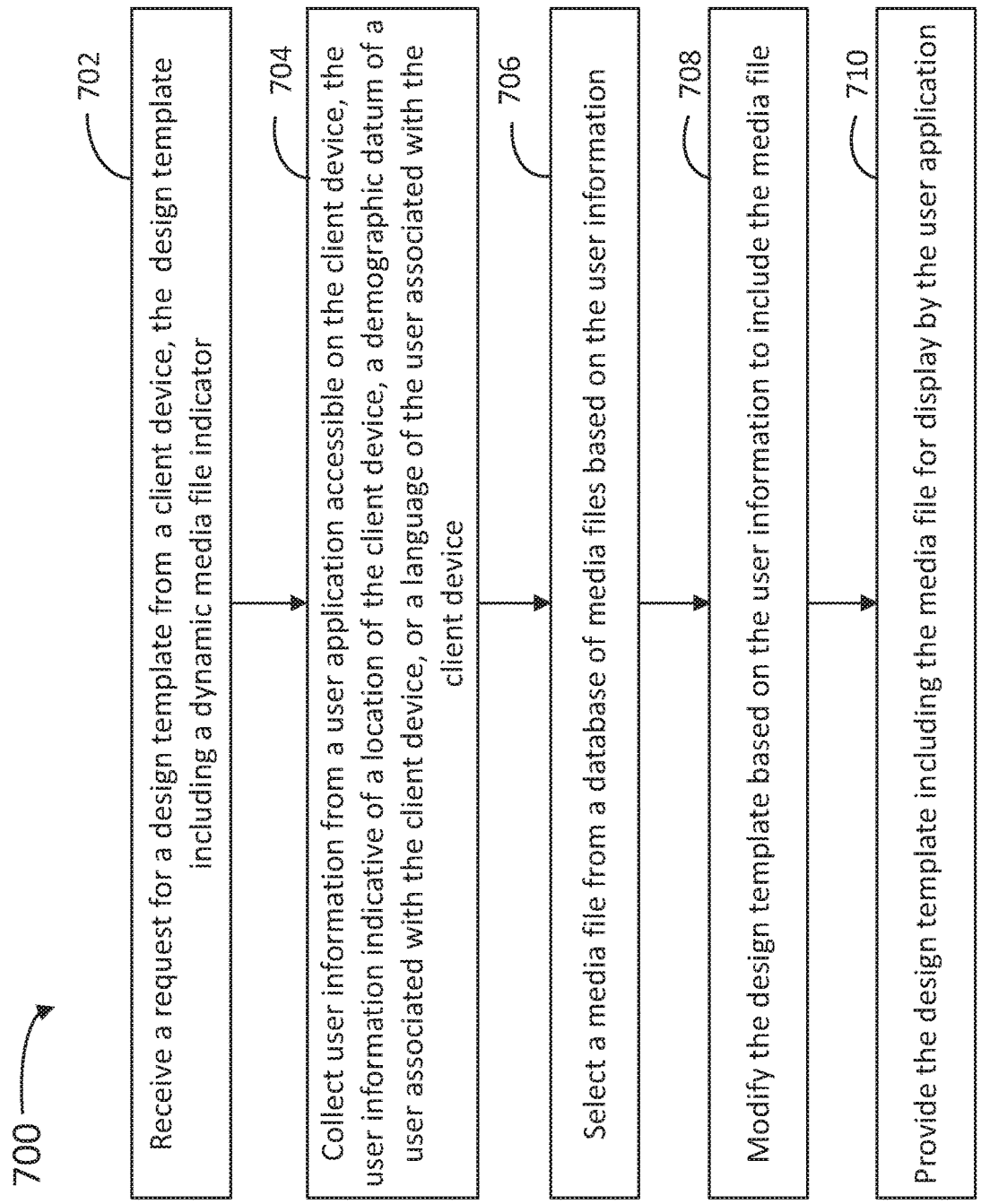
FIG. 7 is a flow chart illustrating steps in a method to provide a dynamic search result tailored according to a personalized information, according to some embodiments.

FIG. 7 is a flow chart illustrating steps in a method 700 to provide a search result, according to some embodiments. Method 700 may be performed at least partially by any one of the network servers hosting a collection of visual media files (e.g., images, video clips, and multimedia files), while communicating with any one of a plurality of client devices (e.g., servers 130 and clients 110). At least some of the steps in method 700 may be performed by a computer having a processor executing commands stored in a memory of the computer (e.g., processors 212 and 236, memories 220 and 232). For example, at least some of the commands may be included in an application installed in a client device accessible by a user (e.g., application 222). Further, steps as disclosed in method 700 may include retrieving, editing, and/or storing files in a database that is part of, or is communicably coupled to, the computer (e.g., training database 248, annotated training database 250, visual media database 252 and interaction history database 254). Methods consistent with the present disclosure may include at least some, but not all, of the steps illustrated in method 700, performed in a different sequence. Furthermore, methods consistent with the present disclosure may include at least two or more steps as in method 700 performed overlapping in time, or almost simultaneously.

Step 702 includes receiving a request for a design template from a client device, the design template including a dynamic media file indicator. In some embodiments, step 702 includes selecting, from the database, a data structure corresponding to the design template, wherein the data structure may include a java script object notation (JSON) format. In some embodiments, step 702 includes identifying a language in a header of the request for the design template.

Step 704 includes collecting user information from the user application accessible on the client device, the user information indicative of a location of the client device, a demographic datum of a user associated with the client device, or a language of the user associated with the client device. In some embodiments, the user information may be included in the request for the design template (e.g., step 702), and step 704 includes parsing the request for the design template and extracting the user information from the request. In some embodiments, step 704 may include selecting a key metric for the data structure of the design template. For example, in some embodiments step 704 includes selecting language as the key metric for the data structure. In some embodiments, step 704 includes tailoring the media file according to one of the geographic location of the client device, the language of the user, and the demographic datum of the user.

Step 706 includes selecting a media file from the database based on the user information. In some embodiments, step 706 includes tailoring the media file according to one of the location of the client device, the language used by the user associated with the client device, or the demographic datum of the user.

Step 708 includes modifying the design template based on the user information to include the media file. In some embodiments step 708 includes identifying a language option for an element of a data structure associated with the design template, and selecting the media file based on the language option. For example, in some embodiments, step 708 may include assigning the characters "en" for the English language, "fr" for the French language, and "de" for the German language. In some embodiments, step 708 may include generating a unique link to a multimedia file from the database. For example, in some embodiments step 708 may include assigning a unique link to a media file "editor-design-18381852.jpg." In some embodiments, step 708 includes matching the header data against a mapping of designs. For example, in some embodiments step 708 may include matching English language users with a multimedia file (e.g., a design image) associated with English, and so forth. In some embodiments, step 708 includes providing the requested multimedia file to the user based on the language setting of the user's browser. In some embodiments, the media file includes an image of a geographic location selected based on the user information, and step 708 includes placing the image of the geographic location as a background image. In some embodiments, the user information includes one of a geographic location of the user, a language used by the user, and a demographic datum of the user, and step 708 includes tailoring the media file according to one of the geographic location of the user, the language used by the user, and the demographic datum of the user.

In some embodiments, step 708 includes adding a text portion in the design template, the text portion including a catch phrase in a language selected according to the user information. In some embodiments, step 708 includes mapping the design template to a geographic location based on a header data in the user information. In some embodiments, step 708 includes providing the media file based on a language setting of a web browser running in the user device, the language setting collected with the user information.

Step 710 includes providing the design template with the media file for display by the user application. In some embodiments, step 710 includes providing an optional modification to the design template for the user based on the user information, wherein the user may select a preferred design template (e.g., choose a Korean-tailored design template over a Japanese-tailored design template when the geographic location is "East Asia").

Figure 8:
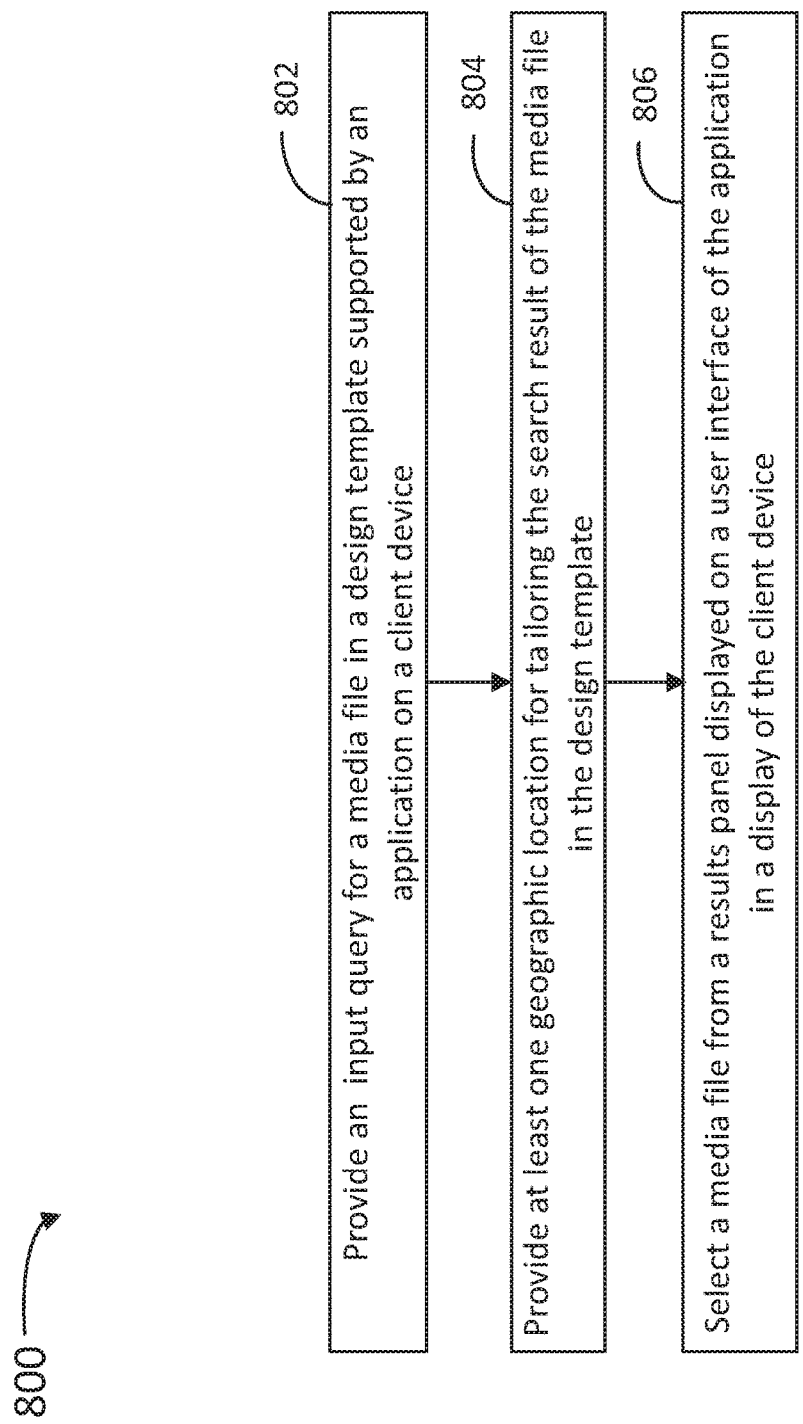
FIG. 8 is a flow chart illustrating steps in a method to perform a dynamic search tailored to a selected geographic location, via an application on a client device, according to some embodiments.

FIG. 8 is a flow chart illustrating steps in a method 800 to perform a search via an application on a client device. Method 800 may be performed at least partially by any one of the network servers hosting a collection of visual media files (e.g., images, video clips, and multimedia files), while communicating with any one of a plurality of client devices (e.g., servers 130 and clients 110). At least some of the steps in method 800 may be performed by a computer having a processor executing commands stored in a memory of the computer (e.g., processors 212 and 236, memories 220 and 232). For example, at least some of the commands may be included in an application installed in a client device accessible by a user (e.g., application 222). Further, steps as disclosed in method 800 may include retrieving, editing, and/or storing files in a database that is part of, or is communicably coupled to, the computer (e.g., training database 248, annotated training database 250, visual media database 252 and interaction history database 254). Methods consistent with the present disclosure may include at least some, but not all, of the steps illustrated in method 800, performed in a different sequence. Furthermore, methods consistent with the present disclosure may include at least two or more steps as in method 800 performed overlapping in time, or almost simultaneously.

Step 802 includes providing an input query for a media file in a design template supported by the application running on a client device. In some embodiments, step 802 may further include creating a design template using the application in the client device, and requesting one of an audio file, an image file, or a video file to an image search engine, for the design template.

Step 804 includes providing at least one geographic location for tailoring the search result of the media file in the design template. In some embodiments, the user may be located in the United States, and interested in creating an advertisement campaign in Southeast Asia. Accordingly, step 804 may include selecting, in a mockup global map in the application, at least one of the countries in Southeast Asia (e.g., Vietnam, Malaysia, Indonesia, etc.) to tailor the advertising campaign to that area.

Step 806 includes selecting a media file from a results panel displayed on a user interface of the application in a display of the client device. In some embodiments, step 806 may include placing the media file (e.g., an image) on the design template. In some embodiments, step 806 may include editing the media file before placing it on the design template. Further, in some embodiments step 806 may include storing the design template in the memory of the client device, or in the database associated with a search engine that provides the media file.

Hardware Overview

Figure 9:
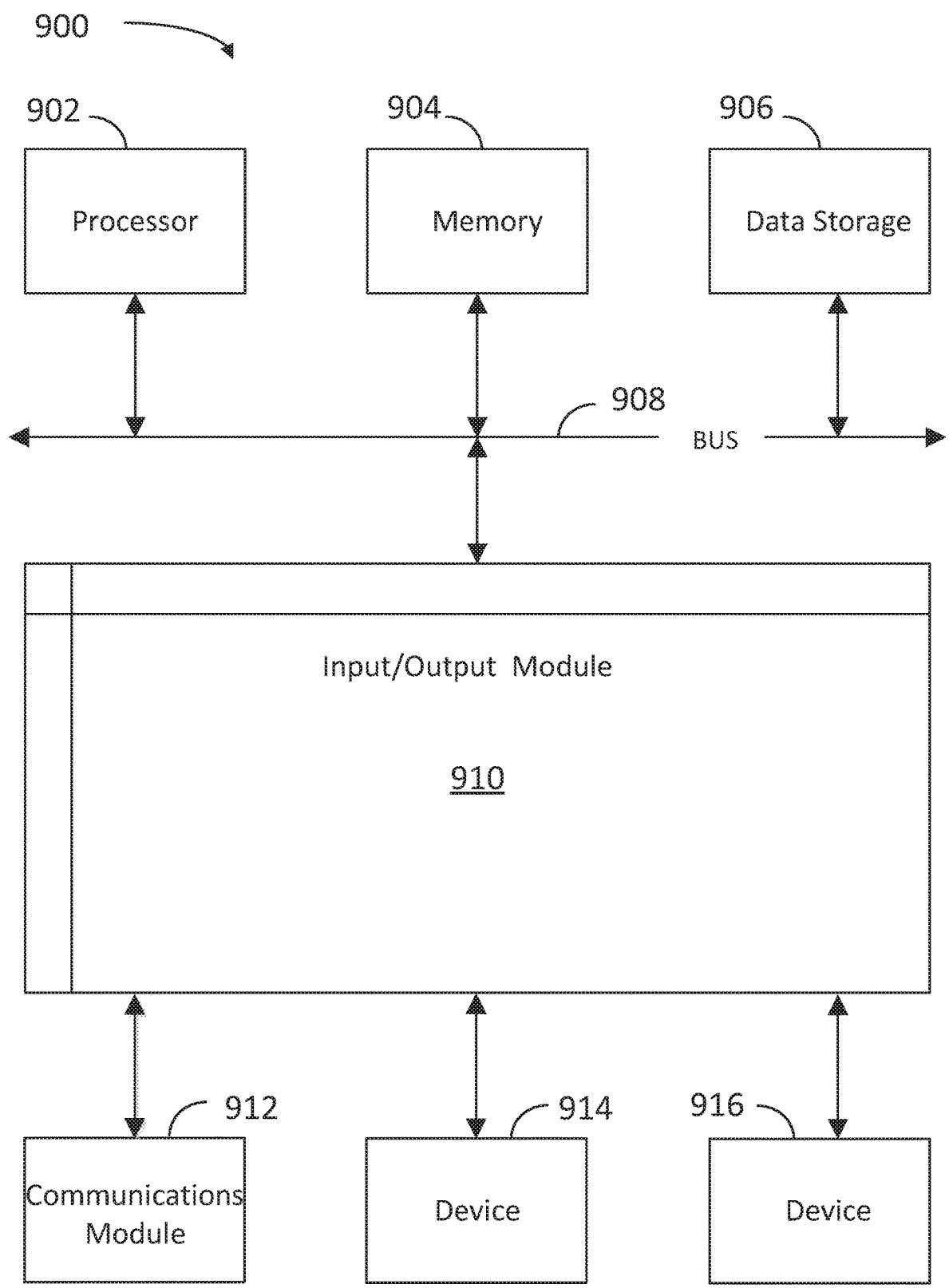
FIG. 9 is a block diagram illustrating an example computer system with which the client and server of FIGS. 1 and 2, and the methods of FIGS. 7 and 8 can be implemented.

FIG. 9 is a block diagram illustrating an exemplary computer system 900 with which the client 110 and server 130 of FIGS. 1 and 2, and the methods of FIGS. 7-8 can be implemented. In certain aspects, the computer system 900 may be implemented using hardware or a combination of software and hardware, either in a dedicated server, or integrated into another entity, or distributed across multiple entities.

Computer system 900 (e.g., client 110 and server 130) includes a bus 908 or other communication mechanism for communicating information, and a processor 902 (e.g., processors 212 and 236) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 (e.g., communications modules 218 and 238) include networking interface cards, such as Ethernet cards and modems. In certain aspects, input/output module 910 is configured to connect to a plurality of devices, such as an input device 914 (e.g., input device 214) and/or an output device 916 (e.g., output device 216). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as a LCD (liquid crystal display) monitor, for displaying information to the user.

According to one aspect of the present disclosure, the client 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   receiving a request for a design template from a client device, the design template comprising a dynamic media file indicator, and the request comprising user information indicative of a location of the client device, a demographic datum of a user associated with the client device, or a language of the user associated with the client device;
   selecting a media file from a database of media files based on the user information and on at least one parameter in the dynamic media file indicator, the at least one parameter selective, from a map, of a geographic region for tailoring the design template, the media file including a portion related to the geographic region and having an image vector information, wherein the selecting comprises searching, with a search engine, for images biased towards the geographic region;
   pairing, with the search engine, the image vector information with an image cluster that represents a semantic concept associated with the geographic region;
   modifying the design template based on the user information and the dynamic media file indicator to include the media file; and
   providing the design template comprising the media file for display by the client device.

2. The computer-implemented method of claim 1, further comprising selecting the at least one parameter in the dynamic media file indicator based on a location of a designer creating the design template.

3. The computer-implemented method of claim 1, further comprising identifying the language of the user in a header of a user request.

4. The computer-implemented method of claim 1, wherein the design template comprises a data structure in a java script object notation format, and further comprising selecting a key metric for the data structure.

5. The computer-implemented method of claim 1, wherein selecting the media file from the database of media files based on the user information comprises generating a unique link to the media file in the database of media files, the unique link accessible through the design template for display in the client device.

6. The computer-implemented method of claim 1, wherein the media file comprises an image of an object in a geographic location selected based on the user information, and modifying the design template comprises placing the image of the object in the geographic location as a background image of the design template.

7. The computer-implemented method of claim 1, wherein modifying the design template based on the user information comprises tailoring the media file according to one of the location of the client device, the language used by the user associated with the client device, or the demographic datum of the user.

8. The computer-implemented method of claim 1, wherein modifying the design template comprises including a text portion in the design template, the text portion including a catch phrase in a language selected according to the user information.

9. The computer-implemented method of claim 1, wherein modifying the design template based on the user information comprises identifying a language option for an element of a data structure associated with the design template, and selecting the media file based on the language option.

10. The computer-implemented method of claim 1, wherein modifying the design template based on the user information comprises mapping the design template to a geographic location based on header data in the user information.

11. The computer-implemented method of claim 1, wherein modifying the design template based on the user information comprises providing the media file based on a language setting of a web browser running on the client device, the language setting collected with the user information.

12. A system comprising:
a memory, storing instructions; and
at least one processor that executes the instructions to:
receive a request for a design template from a client device, the design template comprising a dynamic media file indicator, and the request comprising user information indicative of a location of the client device, a demographic datum of a user associated with the client device, or a language of the user associated with the client device;
select a media file from a database of media files based on the user information and on at least one parameter in the dynamic media file indicator, the at least one parameter selective, from a map, of a geographic region for tailoring the design template, the media file including a portion related to the geographic region and having an image vector information, wherein a selection comprises a search, with a search engine, for images biased towards the geographic region, and pair, with the search engine, the image vector information with an image cluster that represents a semantic concept associated with the geographic region;
modify the design template based on the user information to include the media file; and
provide the design template comprising the media file for display by the client device.

13. The system of claim 12, wherein the at least one processor executes instructions to tailor the media file according to one of the location of the client device, the language used by the user associated with the client device, or the demographic datum of the user associated with the client device.

14. The system of claim 12, wherein the media file is an image of a geographic location selected based on the user information, and to modify the design template the at least one processor executes instructions to place the image of the geographic location as a background image of the design template.

15. The system of claim 12, wherein to modify the design template the at least one processor executes instructions to include a text portion in the design template, the text portion including a catch phrase in a language selected according to the user information.

16. The system of claim 12, wherein the design template comprises a data structure in a java script object notation format, and wherein the at least one processor executes instructions to select a key metric for the data structure.

17. The system of claim 12, wherein to modify the design template based on the user information the at least one processor executes instructions to assign an optional modification to the design template for a user based on the user information.

18. The system of claim 12, wherein to select a media file in the database of media files based on the user information, the at least one processor executes instructions to generate a unique link to the media file in the database of media files, the unique link accessible through the design template displayed in the client device.

19. The system of claim 12, wherein the dynamic media file indicator is selected by a designer of the design template, and the at least one processor executes instructions to receive the design template from the designer, and to store the design template in the database of media files.

20. A computer-implemented method comprising:
providing an input query for a media file in a design template supported by an application on a client device;
providing at least one geographic location for tailoring a search result for the media file in the design template;
selecting an image from a results panel displayed on a user interface of the application in a display of the client device, wherein providing at least one geographic location comprises modifying at least one parameter in a dynamic media file indicator, the at least one parameter selective, from a map, of a geographic region for tailoring the design template, the media file including a portion related to the geographic region and having an image vector information, wherein the selecting comprises searching, with a search engine, for images biased towards the geographic region; and
pairing, with the search engine, the image vector information with an image cluster that represents a semantic concept associated with the geographic region.

* * * * *